United States Patent
Coman

(10) Patent No.: US 9,250,347 B2
(45) Date of Patent: Feb. 2, 2016

(54) METHOD TO LOOK AHEAD OF THE BIT

(75) Inventor: Radu Coman, Hannover (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 567 days.

(21) Appl. No.: 13/488,992

(22) Filed: Jun. 5, 2012

(65) Prior Publication Data

US 2012/0314539 A1 Dec. 13, 2012

Related U.S. Application Data

(60) Provisional application No. 61/495,456, filed on Jun. 10, 2011.

(51) Int. Cl.
*G01V 1/46* (2006.01)
*E21B 47/00* (2012.01)

(52) U.S. Cl.
CPC . *G01V 1/46* (2013.01); *E21B 47/00* (2013.01); *G01V 2200/12* (2013.01); *G01V 2210/161* (2013.01)

(58) Field of Classification Search
CPC .......... G01V 1/40–1/50; G01V 1/375; G01V 2210/161; E21B 47/00–47/01
USPC ................ 340/603, 606–611, 626–627, 632, 340/853.1–856.4; 73/152.01–152.62, 73/863.02, 863.22; 166/66, 250.01–255.3; 175/40–48; 367/81–86
See application file for complete search history.

(56) References Cited

U.S. PATENT DOCUMENTS

| | | | | |
|---|---|---|---|---|
| 4,926,391 A * | 5/1990 | Rector et al. | ..................... | 367/41 |
| 5,012,453 A | 4/1991 | Katz | | |
| 5,050,130 A * | 9/1991 | Rector et al. | ..................... | 367/41 |
| 5,191,557 A * | 3/1993 | Rector et al. | ..................... | 367/41 |
| 5,585,556 A | 12/1996 | Petersen et al. | | |
| 5,696,735 A * | 12/1997 | Krebs | ............................. | 367/50 |
| 5,784,004 A | 7/1998 | Esfahani et al. | | |
| 6,002,642 A * | 12/1999 | Krebs | ............................. | 367/73 |
| 6,078,868 A * | 6/2000 | Dubinsky | .......................... | 702/6 |
| 6,131,694 A | 10/2000 | Robbins et al. | | |
| 6,151,554 A * | 11/2000 | Rodney | ............................. | 702/9 |
| 6,173,793 B1 * | 1/2001 | Thompson et al. | ............. | 175/45 |
| 6,564,883 B2 * | 5/2003 | Fredericks et al. | ............. | 175/50 |
| 6,614,718 B2 * | 9/2003 | Cecconi et al. | .................. | 367/86 |
| 7,540,337 B2 | 6/2009 | McLoughlin et al. | | |
| 7,573,397 B2 | 8/2009 | Petrovic et al. | | |
| 7,730,967 B2 | 6/2010 | Ballantyne et al. | | |
| 2004/0006430 A1 * | 1/2004 | Harmon et al. | .................. | 702/14 |
| 2004/0122594 A1 * | 6/2004 | Matsuoka et al. | .............. | 702/11 |
| 2004/0240320 A1 | 12/2004 | McDonald et al. | | |
| 2005/0007259 A1 | 1/2005 | Minto et al. | | |
| 2005/0034917 A1 * | 2/2005 | Mathiszik et al. | ............ | 181/108 |
| 2005/0041526 A1 * | 2/2005 | Esmersoy et al. | .............. | 367/27 |

(Continued)

*Primary Examiner* — Hai Phan
*Assistant Examiner* — Orlando Bousono
(74) *Attorney, Agent, or Firm* — Mossman Kumar & Tyler PC

(57) ABSTRACT

The present disclosure is direct to method of performing measurements while drilling in an earth formation. The method may include estimating a location of a seismic reflector using signals from one or more of seismic sensors located at a plurality of locations in a borehole and the drilling depth of the one or more seismic sensors in a borehole. The signals may include information about times when the seismic sensors detect a direct wave and a reflected wave. The method may include storing the information in a memory using a processor.

13 Claims, 4 Drawing Sheets

(56) References Cited

U.S. PATENT DOCUMENTS

| | | |
|---|---|---|
| 2005/0047277 A1* | 3/2005 | Chamberlain et al. ........ 367/136 |
| 2005/0052949 A1* | 3/2005 | Gaston et al. .................... 367/57 |
| 2005/0149266 A1* | 7/2005 | Mathiszik et al. ............... 702/14 |
| 2005/0205300 A1* | 9/2005 | Mathiszik ........................ 175/48 |
| 2006/0077757 A1* | 4/2006 | Cox et al. ........................ 367/25 |
| 2007/0021951 A1* | 1/2007 | Lee Seislink ................... 703/10 |
| 2007/0097788 A1* | 5/2007 | Tang et al. ...................... 367/52 |
| 2007/0118293 A1* | 5/2007 | Adams ............................ 702/14 |
| 2007/0153628 A1* | 7/2007 | Mathiszik et al. ............... 367/57 |
| 2007/0265782 A1* | 11/2007 | Kleinberg et al. ................ 702/6 |
| 2007/0271038 A1* | 11/2007 | Mathiszik et al. ................. 702/6 |
| 2008/0086270 A1* | 4/2008 | Mathiszik ......................... 702/9 |
| 2008/0291780 A1* | 11/2008 | Basaki ............................ 367/27 |
| 2008/0312839 A1* | 12/2008 | Mathiszik et al. ............. 702/11 |
| 2008/0316860 A1* | 12/2008 | Muyzert et al. ................. 367/25 |
| 2009/0034366 A1* | 2/2009 | Mathiszik et al. ............. 367/25 |
| 2009/0122645 A1* | 5/2009 | Guigne et al. ................... 367/56 |
| 2010/0101861 A1* | 4/2010 | Chang ............................ 175/40 |
| 2010/0313646 A1 | 12/2010 | Mehta et al. |
| 2010/0315901 A1 | 12/2010 | Coman et al. |
| 2010/0322030 A1 | 12/2010 | Coman et al. |
| 2011/0022319 A1 | 1/2011 | Djikpesse et al. |
| 2011/0305110 A1* | 12/2011 | Taherian et al. ................ 367/33 |

* cited by examiner

METHOD TO LOOK AHEAD OF THE BIT

CROSS-REFERENCE TO RELATED APPLICATION

This application claims priority from U.S. Provisional Patent Application Ser. No. 61/495,456, filed on 10 Jun. 2011, incorporated herein by reference in its entirety.

BACKGROUND OF THE DISCLOSURE

1. Field of the Disclosure

The present disclosure relates to a method of locating seismic features in an earth formation.

2. Description of the Related Art

Conventional reflection seismology utilizes surface sources and receivers to detect reflections from subsurface impedance contrasts. The obtained image often suffers in spatial accuracy, resolution, and coherence due to the long travel paths between source, reflector, and receiver. In particular, due to the two-way passage of seismic signals through a highly absorptive near surface weathered layer with a low, laterally varying velocity, subsurface images are poor quality. To overcome this difficulty, a technique commonly known as vertical seismic profiling (VSP) was developed to image the subsurface in the vicinity of a borehole. With VSP, a surface seismic source is used and signals are received at a single downhole receiver or an array of downhole receivers. This is repeated for different depths of the receiver (or receiver array). In offset VSP, a plurality of spaced apart sources may be sequentially activated, enabling imaging of a larger range of distances than would be possible with a single source.

VSP measurements made during drilling operations are referred to as Seismic-while-drilling (SWD®). The signals generated by seismic sources are reproducible and may be stacked. The other kind of data recorded by the seismic sensors is noise. Background noise (drilling noise, circulation noise, rig noise, cultural noise, environmental noise) may be distinguished from spiky noise (e.g. due to hitting the drill string while connection; micro earthquakes close to the borehole). It may be helpful to restrict seismic recording of data to low-noise periods. It may also helpful to stack the data. Because the noise is random, stacking the data may increase the signal to noise ratio.

The SWD® measurements may include the VSP-while drilling (VSP-WD) method and the checkshot-WD (CS-WD) method. These methods permit updating of the geological model. In this way one can reduce the drilling risk and/or update the optimal well path. The importance of real-time processing is evident, but a full real-time processing isn't possible yet. One limitation of Seismic-while-drilling measurements is the small bandwidth of the uplinks and downlinks. The communication is done via mud telemetry, which is possible only while circulating. Hence when tripping in or tripping out, measurements are done without circulating between shooting windows, and it is not possible to send uplink signals and downlink signals. Even when mud telemetry is possible, the bandwidth available for uplink signals and downlink signals is very small.

Due to the small uplink bandwidth, the downhole tool must automatically detect and process the shooting sequence(s) downhole. Only the final results (e.g., the first-break time) are sent to the surface.

Another limitation VSP-WD is the requirement highly accurate clocks (on the order of 1 millisecond time drift per ten day period) that are synchronized for performing measurements. The requirements for high accuracy and synchronization may result in high complexity and cost.

There is a need for a method of performing seismic measurements that may use less accurate, and hence less complex and less expensive, clocks and synchronization systems. The present disclosure addresses this need.

SUMMARY OF THE DISCLOSURE

In aspects, the present disclosure is related to systems, devices, and methods of locating seismic features in an earth formation.

One embodiment according to the present disclosure includes a method of performing measurements while drilling in an earth formation, the method comprising: estimating a location of a seismic reflector using (i) a plurality of signals from at least one seismic sensor, each signal being generated at a unique drilling depth and indicative of a direct wave and a reflected wave, and (ii) the at least one unique drilling depth for the at least one seismic sensor; wherein a time of initiation of the direct wave is indeterminate to a clock associated with the at least one seismic sensor.

Another embodiment according to the present disclosure includes a non-transitory computer-readable medium product having instructions thereon that, when executed, cause at least one processor to perform a method, the method comprising: estimating a location of a seismic reflector using (i) a plurality of signals from at least one seismic sensor, each signal being generated at a unique drilling depth and indicative of a direct wave and a reflected wave, and (ii) the at least one unique drilling depth for the at least one seismic sensor; wherein a time of initiation of the direct wave is indeterminate to a clock associated with the at least one seismic sensor.

BRIEF DESCRIPTION OF THE DRAWINGS

The present disclosure is best understood with reference to the accompanying figures in which like numerals refer to like elements, and in which.

DETAILED DESCRIPTION OF THE DISCLOSURE

The present disclosure relates to locating seismic features using one or more of seismic sensors located at a plurality of locations in a borehole. The location of seismic features while drilling may be beneficial for providing information for use in drilling operations, including, but not limited to, geosteering, geostopping, setting a casing point, adjusting properties of drilling fluids, and adjusting drilling parameters (weight-on-bit, rate of penetration, revolutions per minute, flow rate, etc.). Some non-limiting embodiments for locating seismic features follow below.

Figure 1:
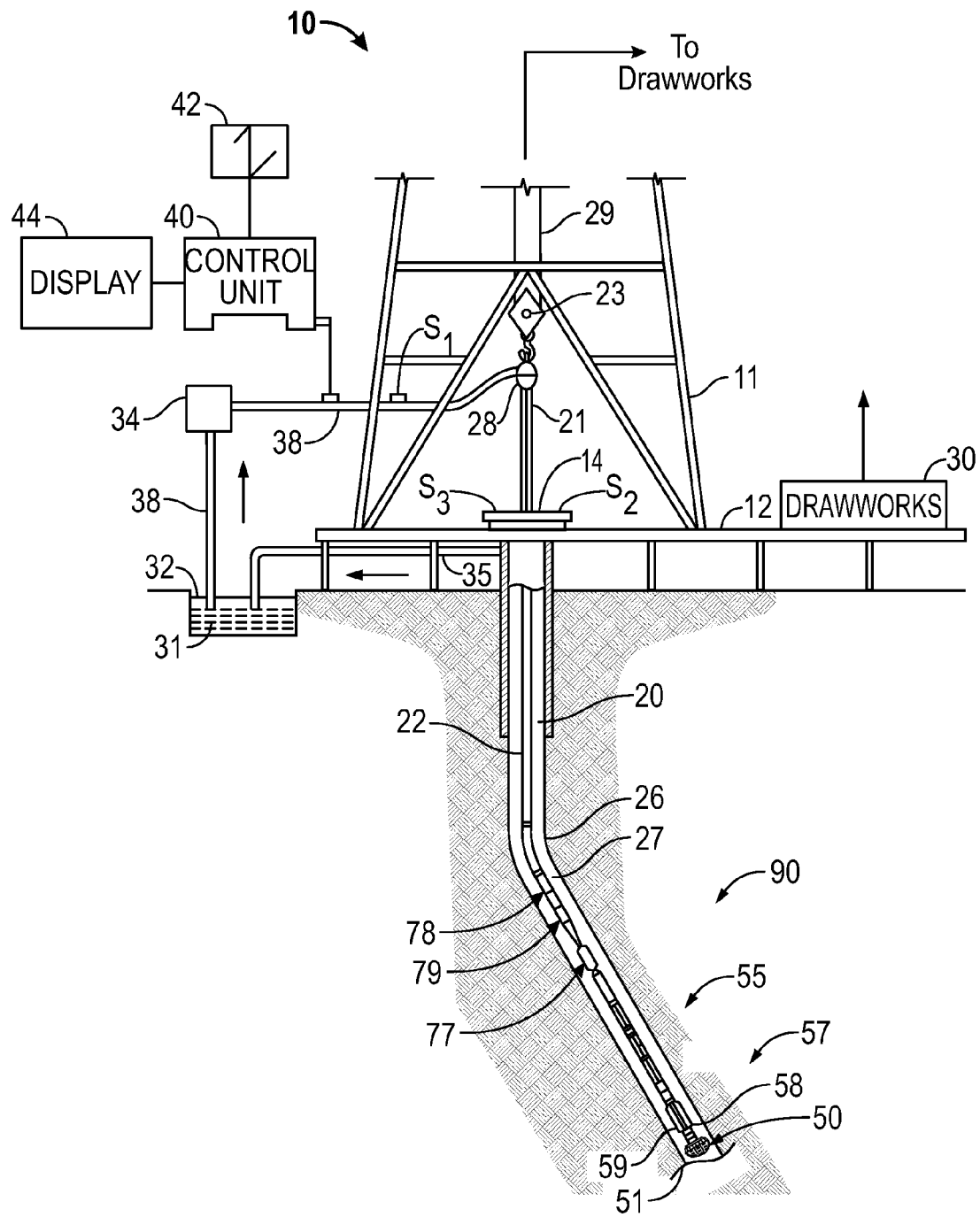
FIG. 1 shows a logging-while-drilling device suitable for use with one embodiment according to the present disclosure.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the borehole. The drilling system 10 includes a conventional derrick 11 erected on a floor 12 which supports a rotary table 14 that is rotated by a prime mover such as an electric motor (not shown) at a desired rotational speed. The drillstring 20 includes tubing such as a drill pipe 22 or a coiled-tubing extending downward from the surface into the borehole 26. The drillstring 20 is pushed into the borehole 26 when a drill pipe 22 is used as the tubing. For coiled-tubing applications, a tubing injector, such as an injector (not shown), however, is used to move the tubing from a source thereof, such as a reel (not shown), to the borehole 26. The drill bit 50 attached to the end of the drillstring breaks up the geological formations when it is rotated to drill the borehole 26. If a drill pipe 22 is used, the drillstring 20 is coupled to a drawworks 30 via a kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 can provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module may contain sensors, circuitry, and processing software and algorithms relating to the dynamic drilling parameters. Such parameters can include bit bounce, stick-slip of the drilling assembly, backward rotation, torque, shocks, borehole and annulus pressure, acceleration measurements, and other measurements of the drill bit condition. A suitable telemetry or communication sub 77 using, for example, two-way telemetry, is also provided as illustrated in the drilling assembly 90. The drilling sensor module processes the sensor information and transmits it to the surface control unit 40 via the telemetry system 77.

The communication sub 77, a power unit 78 and an MWD tool 79 are all connected in tandem with the drillstring 20. Flex subs, for example, are used in connecting the MWD tool 79 in the drilling assembly 90. Such subs and tools may form the bottom hole drilling assembly 90 between the drillstring 20 and the drill bit 50. The drilling assembly 90 may make various measurements including the pulsed nuclear magnetic resonance measurements while the borehole 26 is being drilled. The communication sub 77 obtains the signals and measurements and transfers the signals, using two-way telemetry, for example, to be processed on the surface. Alternatively, the signals can be processed using a downhole processor at a suitable location (not shown) in the drilling assembly 90.

The surface control unit or processor 40 may also receive one or more signals from other downhole sensors and devices and signals from sensors $S_1$-$S_3$ and other sensors used in the system 10 and processes such signals according to programmed instructions provided to the surface control unit 40. The surface control unit 40 may display desired drilling parameters and other information on a display/monitor 44 utilized by an operator to control the drilling operations. The surface control unit 40 can include a computer or a microprocessor-based processing system, memory for storing programs or models and data, a recorder for recording data, and other peripherals. The control unit 40 can be adapted to activate alarms 42 when certain unsafe or undesirable operating conditions occur.

Figure 2:
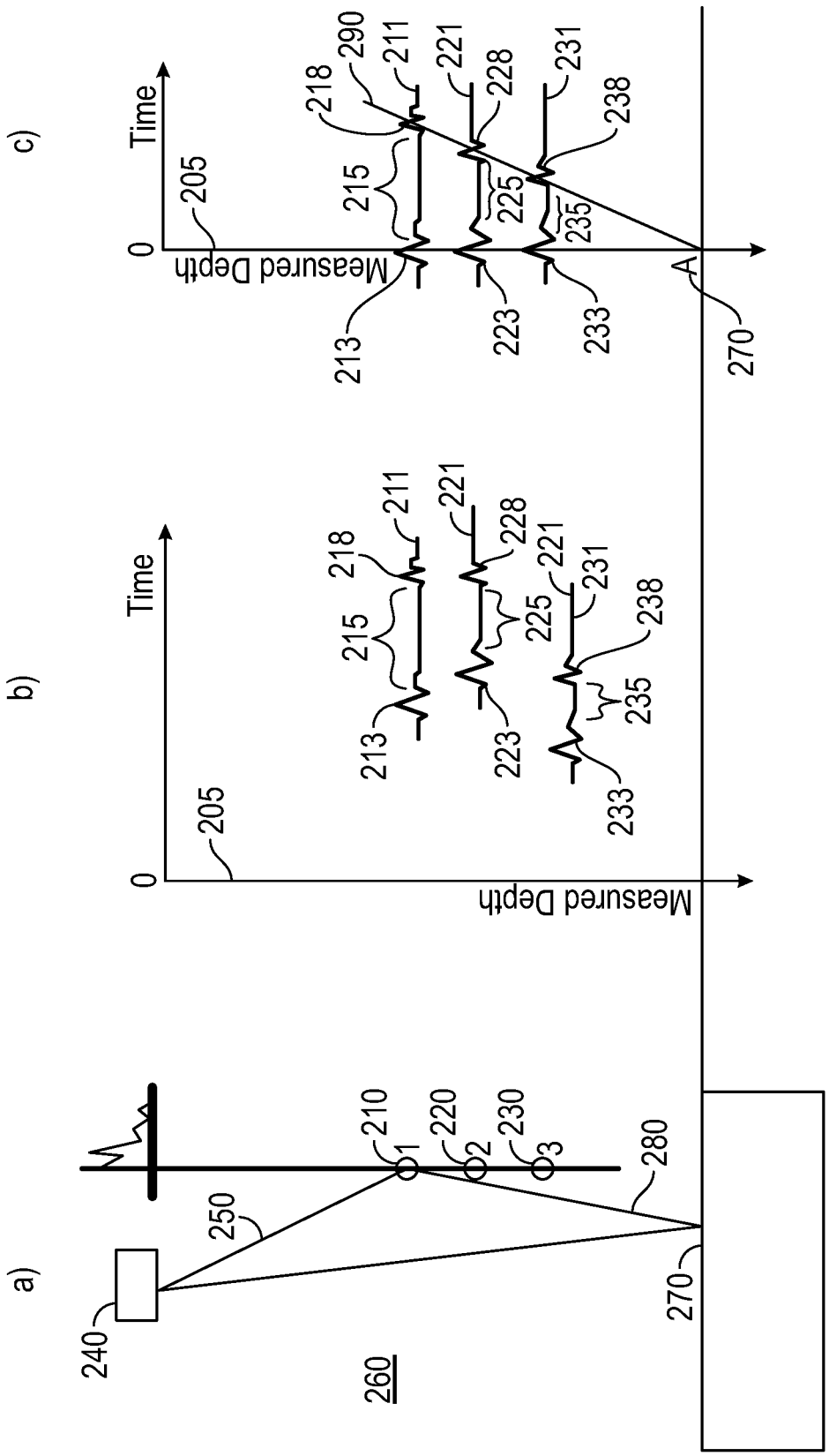
FIG. 2a illustrates the arrangement of source and sensors for one embodiment according to the present disclosure.
FIG. 2b shows an set of curves indicating signals generated by the arrangement of sensors for one embodiment according to the present disclosure.
FIG. 2c shows a set of curves aligned with the response of the sensors to the direct wave as time equals zero for one embodiment according to the present disclosure.

FIG. 2a shows a schematic of one embodiment according to the present disclosure. The drilling assembly 90 may include a plurality of seismic sensors 210, 220, 230, positioned behind the location of the drill bit 50. A seismic source 240 may be located at the surface and configured to generate seismic waves 250 in earth formation 260. The direct seismic waves 250 may be reflected by a seismic feature such as seismic reflector 270, thus forming reflected seismic waves 280. The seismic reflector 270 may be any barrier that reflects seismic waves. Any boundary that has an acoustic impedance change across the boundary will reflect seismic waves. These include, but are not limited to, one or more of: (i) a limit between geological layers, (ii) a stratigraphical discordance, (iii) a fault, (iv) an interface between two fluids in rock. The use of three seismic sensors 210, 220, 230 is illustrative and exemplary only, as any number of seismic sensors may be used for embodiments of the present disclosure.

Seismic source 240 may be any seismic wave generating device, including, but not limited to, one or more of: (i) an airgun and (ii) a seismic vibrator. While seismic source 240 is shown at the surface in FIG. 2a, this location is exemplary and illustrative only, seismic source 240 may also be positioned in one of: (i) the same borehole as the seismic sensors, (ii) the drilling assembly, (iii) a nearby borehole. Seismic sensors 210, 220, 230 be any device configured to measure seismic waves, including, but not limited to, one or more of: (i) a hydrophone, (ii) a geophone, (iii) an accelerometer, and (iv) a microelectromechancial system (MEMS). The term "geophone" is intended to include a multicomponent geophone. Seismic sensors 210, 220, 230 may also include, or be in communication with, a clock, a memory unit, a processor, and a power source. In some embodiments, a seismic sensor 210, 220, 230 may include multiple sensing devices of the same or different types.

FIG. 2b. shows a set of curves 211, 221, 231 representing signals generated by seismic sensors 210, 220, 230 in response to waves 250, 280. Each set of curves 211, 221, 231 are shown as generated by signals at different positions along a drilling depth axis 205. Herein, drilling depth refers to a distance of travel along the borehole 26. A first set of pulses 213, 223, 233 represent the direct wave 250 detected at the respective seismic sensors 210, 220, 230. Those versed in the art and having benefit of the present disclosure would recognize that normally, the direct arrival times may increase monotonically with the depth of the sensor. However, the direct arrival times may also be subject to large time drifts. In this particular example, the arrival time 233 does not monotonically increase with the depth of the sensor, which may be due to one or more of: (i) time drift and (ii) use of a different source excitation (and initiation time) than that corresponding to 213 and 223. A second set of pulses 218, 228, 238 represent the reflected wave 280 detected at the respective seismic sensors 210, 220, 230. The first set of pulses 213, 223, 233 and the second set of pulses 218, 228, 238 may be generated by the seismic sensors 210, 220, 230 independent of information regarding an initiation of the direct wave 250 by seismic source 240. The first set of pulses 213, 223, 233 and the second set of pulses 218, 228, 238 define respective time gaps 215, 225, 235.

FIG. 2c shows the set of curves 211, 221, 231 from FIG. 2b where the first set of pulses 213, 223, 233 are aligned such that the each encounter of the direct waves 250 with a seismic sensor 210, 220, 230 represents a beginning time, t=0. Then the second set of pulses 218, 228, 238 may be aligned by curve 290. Curve 290 may be extrapolated to estimate the location of seismic reflector 270. Curve 290 may be formed using a mathematical process, including, but not limited to, a regression technique.

Figure 3:
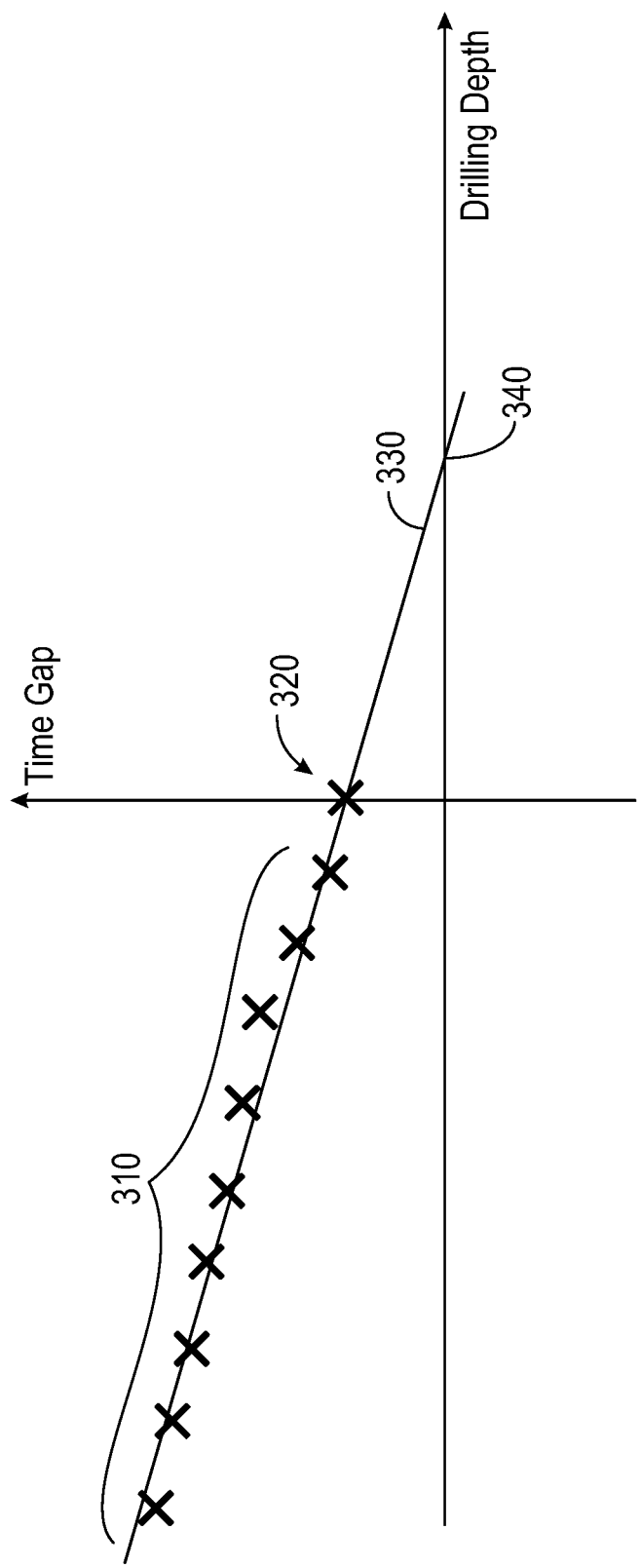
FIG. 3 shows a curve for one embodiment using a single seismic sensor according to the present disclosure.

FIG. 3 shows a graph of data points from a single seismic sensor 210 using another embodiment according to the present disclosure. The graph includes past data points 310 and a present data point 320 recorded by a seismic sensor 210 at different times. Each data point represents a time gap measured at a known drilling depth of the seismic sensor 210. A curve 330 may be generated based on the past data points 310 and the present data point 320 using a curve fitting technique. The curve fitting technique may include, but is not limited to, one or more of: linear regression and polynomic regression. For example, those versed in the art and having benefit of the present disclosure would recognize that the reflection time of a planar reflector inclined to the borehole may be a quadratic or higher polynomic function. The curve 330 may be extrapolated to intersect an estimated point of intersection 340, which represents the drilling depth where the time gap is estimated to decrease to zero and may be indicative of the location of the seismic reflector 270. In some embodiments, additional information may be used to generate the curve 330, including, but not limited to, velocity in the geological layer, and an inclination of the seismic reflector. The use of single seismic sensor at a plurality of unique drilling depths in exemplary and illustrative only, as a plurality of seismic sensors may be used where each seismic sensor generates signals at different drilling depths. In some embodiments, a plurality of curves, one for each seismic sensor, may be generated. The plurality of curves may be used to improve accuracy of the estimated point of intersection by one or more of: (i) comparing two or more of the plurality of curves and (ii) combining two or more of the plurality of curves.

Figure 4:
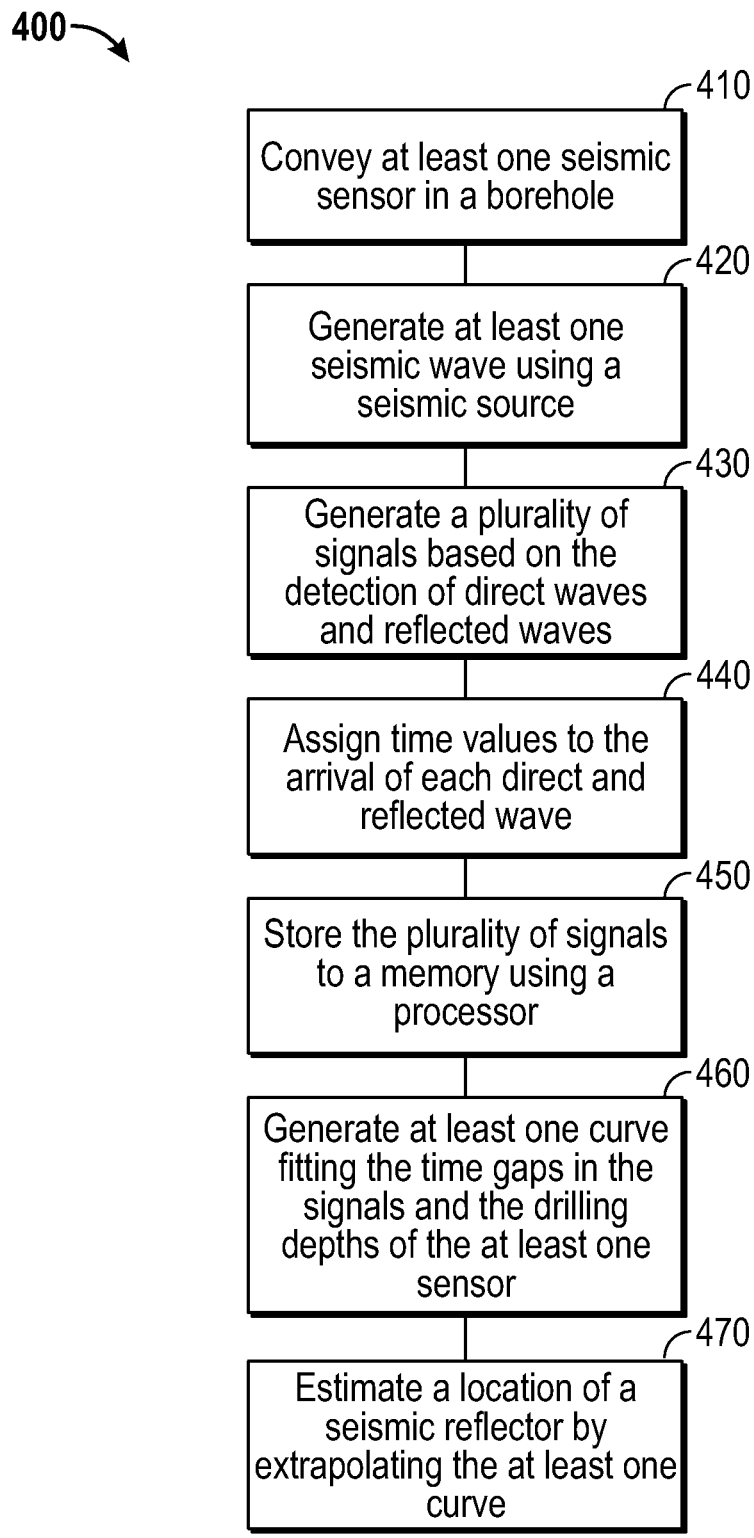
FIG. 4 shows a flow chart of a method according to one embodiment of the present disclosure.

FIG. 4 shows a flow chart of a method 400 according to one embodiment of the present disclosure. In step 410, at least one seismic sensor 210, 220, 230 may be conveyed in a borehole 26. In step 420, at least one seismic wave 250 may be generated using a seismic source 240. In step 430, a plurality of signals 211, 221, 231 may be generated based on the detection of a first set of pulses 213, 223, 233 in response to the detection of direct wave 250 by the at least one seismic sensor 210, 220, 230 and the detection of a second set of pulses 218, 228, 238 in response to the detection of reflected wave 280 by the at least one seismic sensor 210, 220, 230. In step 440, time values may be assigned to each of the arrival times of the direct wave 250 and reflected wave 280 for each signal 211, 221, 231. The time values assigned may be independent of the initiation time of the direct wave 250 by seismic source 240. In step 450, the plurality of signals 211, 221, 231 may be stored to a memory using a processor for later retrieval. In step 460, at least one curve 290 may be generated by curve fitting the time gaps 215, 225, 235 between the first set of pulses 213, 223, 233 and the second set of pulses 218, 228, 238 and the unique drilling depths of the at least one seismic sensor 210, 220, 230 when the plurality of signals 211, 221, 231 were received. In step 470, the location of a seismic reflector 270 may be estimated by extrapolating curve 290 to the point where the time gap is estimated to equal zero.

In some embodiments, the plurality of seismic sensors 210, 220, 230 may be conveyed to a new location in the borehole 26 after step 450 and then steps 420-450 may be repeated. In some embodiments, a plurality of curves may be generated using a plurality of seismic sensors where each of the plurality of seismic sensors generates a plurality of signals at a plurality of unique drilling depths. In some embodiments, the estimation of the location of seismic reflector 270 may include, but is not limited to, one or more of: (i) comparing at least one of the plurality of curves with another of the plurality of curves and (ii) combining at least two of the plurality of curves. In some embodiments, portions of steps 430-450 corresponding to the detection of the second set of pulses 218, 228, 238 in response to the detection of reflected wave 280 may be performed at the surface using analogous equipment (not shown) to that used in the borehole 26.

The location of the seismic reflector 270 maybe estimated relative to one or more of: (i) a drilling direction, (ii) a direction normal to the seismic reflector 270, and (iii) a direction normal to the drillstring 20. In some embodiments, the orientation of the seismic reflector 270 may be estimated. In some embodiments, the curvature of the seismic reflector 270 may be estimated. In still other embodiments, the continuity of the seismic reflector 270 may be estimated.

The signals from the seismic sensors 210, 220, 230 may be stored in a memory by a processor. In some embodiments, the times of the direct and reflected waves may have time stamps assigned. The time stamps may be provided using a downhole clock (not shown) in or associated with drilling assembly 90. The downhole clock accuracy may include a time drift of less than one millisecond per 100 seconds. The downhole clock may be synchronized prior to or while the drilling assembly 90 is in the borehole 26. While in the borehole 26, downhole clock may be synchronized by another clock in the borehole 26 or a surface clock. The surface clock may include one or more of: (i) a GPS clock, (ii) a quartz clock, and (iii) an atomic clock.

In some embodiments, the downhole clock may not require synchronization with another clock. Additionally, the method may be performed with a quartz clock or other clock having more time drift (around 1 milliseconds per 100 seconds), and consequently less expense, than higher accuracy clocks, such as microprocessor controlled ovenized oscillators and atomic clocks, which may also have larger power requirements.

The processor may be configured to start storing signals in the memory on detection of a reference event, where the reference event may include one or more of: (i) a first arrival wave, (ii) a direct wave, and (iii) a downgoing wave. The starting point of the reference event signal may include, but is not limited to, one of: (i) a first break, (ii) a first peak, (iii) a first trough, and (iv) a point of largest amplitude.

The processor may also be configured to process the signals received by the seismic sensors 210, 220, 230, where processing may include, but is not limited to, one or more of: (i) resampling, (ii) filtering, (iii) stacking, (iv) averaging, (v) correlation, (vi) cross-correlation, (vii) amplitude normalization, (viii) event picking, and (ix) statistical estimation. In some embodiments, processing may be performed in real time or at the surface.

Signals maybe be transmitted to the surface, either pre- or post-processing, using, but not limited to, one or more of: (i) mud-pulse telemetry, (ii) wired-pipe telemetry, (iii) electromagnetic telemetry, (iv) acoustic telemetry, and (v) a memory download at the surface.

The apparatus for use with the present disclosure may include a downhole processor that may be positioned at any suitable location within or near the bottom hole assembly. The use of the processor is described below.

The processing of the data may be done by a downhole processor and/or a surface processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories, and Optical disks. Such media may also be used to store results of the processing.

While the foregoing disclosure is directed to specific embodiments of the disclosure, various modifications will be apparent to those skilled in the art. It is intended that all such variations within the scope and spirit of the appended claims be embraced by the foregoing disclosure.

I claim:

1. A method of performing measurements while drilling in an earth formation, the method comprising:
  estimating a location of a seismic reflector using (i) a plurality of signals from at least one seismic sensor, each signal being generated at a unique drilling depth and indicative of a direct wave and a reflected wave, and (ii) the at least one unique drilling depth for the at least one seismic sensor, wherein estimating the location of the seismic reflector comprises:
    assigning an arbitrary value to each arrival time of the direct waves detected from the plurality of signals;
    determining an associated time gap between each arrival time of the direct waves and the reflected waves for the at least one seismic sensor from the plurality of signals;
    generating a curve, using a regression calculation, that fits the associated time gaps at unique drilling depths for the at least one seismic sensor; and
    estimating the location of the seismic reflector using an intersection point along the curve.

2. The method of claim 1, wherein the seismic reflector includes a boundary between two layers with differing lithologies.

3. The method of claim 1, further comprising:
  generating the direct wave using at least one seismic source.

4. The method of claim 1, further comprising:
  transmitting the plurality of signals to the earth's surface.

5. The method of claim 1, further comprising:
  conveying the at least one seismic sensor in a borehole in the earth formation.

6. The method of claim 1, wherein estimating the location of the seismic reflector comprises assigning the same arbitrary value to each arrival time detected from the plurality of signals.

7. The method of claim 1, further comprising:
  assigning time values for the arrival times of the reflected waves detected from the plurality of signals.

8. The method of claim 7, further comprising:
  storing the time values to a memory.

9. The method of claim 1, wherein the at least one seismic sensor comprises a plurality of seismic sensors, and wherein the plurality of signals comprises a plurality of signals from each of the plurality of seismic sensors.

10. The method of claim 9, wherein estimating the location of the seismic reflector comprises:
  generating a plurality of curves, wherein each curve is based on the plurality of signals from one of the plurality of seismic sensors; and
  estimating the location of the seismic reflector using at least two of the plurality of curves.

11. A non-transitory computer-readable medium product having instructions thereon that, when executed, cause at least one processor to perform a method, the method comprising:
  estimating a location of a seismic reflector using (i) a plurality of signals from at least one seismic sensor, each signal being generated at a unique drilling depth and indicative of a direct wave and a reflected wave, and (ii) the at least one unique drilling depth for the at least one seismic sensor, wherein estimating the location of the seismic reflector comprises:
    assigning an arbitrary value to each arrival time of the direct wave detected from the plurality of signals;
    determining an associated time gap between each arrival time of the direct waves and the reflected waves for the at least one seismic sensor from the plurality of signals;
    generating a curve, using a regression calculation, that fits the associated time gaps at unique drilling depths for the at least one seismic sensor; and
    estimating the location of the seismic reflector using an intersection point along the curve.

12. The non-transitory computer-readable medium product of claim 11 further comprising at least one of: (i) a ROM, (ii) an EPROM, (iii) an EEPROM, (iv) a flash memory, or (v) an optical disk.

13. The non-transitory computer-readable medium product of claim 11, wherein estimating the location of the seismic reflector comprises assigning the same arbitrary value to each arrival time detected from the plurality of signals.

* * * * *